United States Patent [19]
Saruhashi

[11] 3,765,691
[45] Oct. 16, 1973

[54] CHUCK
[75] Inventor: Shigeru Saruhashi, Tsushima, Japan
[73] Assignee: Howa Kogyo Kabushiki Kaisha, Aichi-ken, Japan
[22] Filed: Dec. 16, 1971
[21] Appl. No.: 208,664

[30] Foreign Application Priority Data
Dec. 17, 1970 Japan............................ 43/113318

[52] U.S. Cl.................. 279/71, 279/110, 279/116, 279/121
[51] Int. Cl....................... B23b 31/16, B23b 31/26
[58] Field of Search................... 279/121, 114, 110, 279/113, 115, 116, 117, 118, 119, 120, 122, 66, 71

[56] References Cited
UNITED STATES PATENTS
2,597,280 5/1952 Barnes............................. 279/121
3,456,956 7/1969 Herbkersman.................. 279/121 X
2,921,796 1/1960 Ernest.............................. 279/110
3,682,491 8/1972 Sakazaki et al................. 279/121 X Primary Examiner—Andrew R. Juhasz
Assistant Examiner—James F. Coan
Attorney—Holman & Stern

[57] ABSTRACT

A chuck comprises a hollow, substantially cylindrical body part having several guide grooves arranged radially in its front face. Carriages for supporting jaws are respectively slidably received in the guide grooves, and the radial movement of the carriages is effected by sliders when these are moved either axially, by a movable guide block installed in the body part, or radially, by means including bevel gearing. The axial movement of the sliders, which causes a powerful radial movement of the carriages by a wedging action, is accomplished through a rod projecting from the guide block to be coupled to suitable driving means, whereas the radial movement of the sliders may be effected by manual operation.

6 Claims, 8 Drawing Figures

CHUCK

BACKGROUND OF THE INVENTION

This invention relates generally to chucks and in particular to a new and improved universal chuck in which all the gripping jaws are moved together by suitable driving means or manual operation while being kept at the same distance from the center.

Most of the known chucks of mechanically operated type have comparatively short jaw stroke, so that their jaws must often be re-mounted or altogether replaced to hold workpieces of varied sizes. This incurs considerable waste of time and labor especially when a great variety of workpieces of different dimensions must be machined in limited quantities.

SUMMARY OF THE INVENTION

In view of the above described difficulty accompanying known chucks, it is an object of the present invention to provide a chuck which is simple and inexpensive in construction, and in which the gripping jaws are adjustable both easily and quickly to hold a wide range of workpiece diameters.

Another object of the invention is to provide a so-called "universal" chuck in which all the jaws are moved together by any desired driving means such as, for example, a power cylinder.

Still another object of the invention is to provide a chuck having jaws which can be moved both mechanically and manually without the slightest modification of its construction.

A further object of the invention is to provide a chuck in which sliders adapted to cause radial movement of carriages supporting the respective jaws can be moved either axially, by suitable driving means, or radially, by manual operation.

A further object of the invention is to provide a chuck in which the sliders are engaged with the jaw carriages by a oblique tongue-and-groove joint whereby the axial movement of the former causes a powerful radial movement of the latter by a wedging action.

According to the present invention, briefly summarized in its broader aspects, there is provided a chuck comprising a body part of substantially cylindrical shape with a hollow extending axially therethrough, a plurality of carriages respectively slidably received in radial guide groove formed in the front face of the body part, the carriages being adapted to support respective workpiece gripping jaws, a guide block axially slidably received in the hollow of the body part, the guide block having a plurality of radial guide slots formed in its front end so as to be respectively axially aligned with the guide grooves of the body part, means for axially moving said guide block, a plurality of sliders respectively received in the radial guide slots of the guide block so as to be radially slidable relative to the same and axially movable therewith, the sliders being respectively engaged with the carriages in a manner such that the radial movement of the former causes the simultaneous radial movement of the latter while the axial movement of the former causes only the radial movement of the latter, and means for imparting radial movement to the sliders.

The novel features which are considered as characteristic of this invention are set forth with particularity in the appended claims. The invention itself, however, both as to its construction and its mode of operation, together with the above stated and various other objects and advantages thereof, will be best understood from the following description of a preferred embodiment when read in connection with the accompanying drawings.

DETAILED DESCRIPTION

Figure 1:
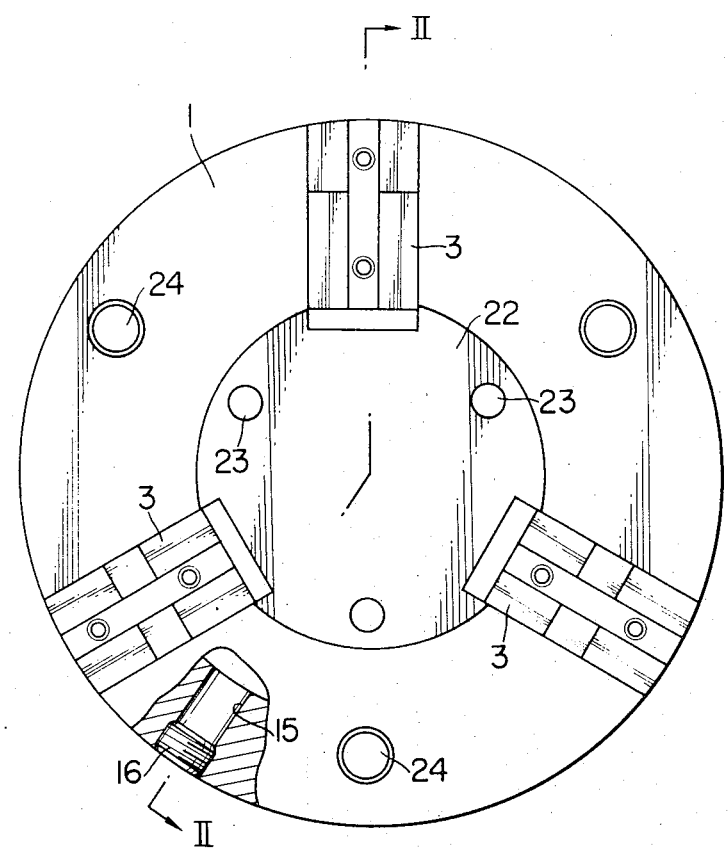
FIG. 1 is a partly broken-away front elevational view showing a three-jaw universal chuck by way of an example of a preferred embodiment of the present invention.
Figure 2:
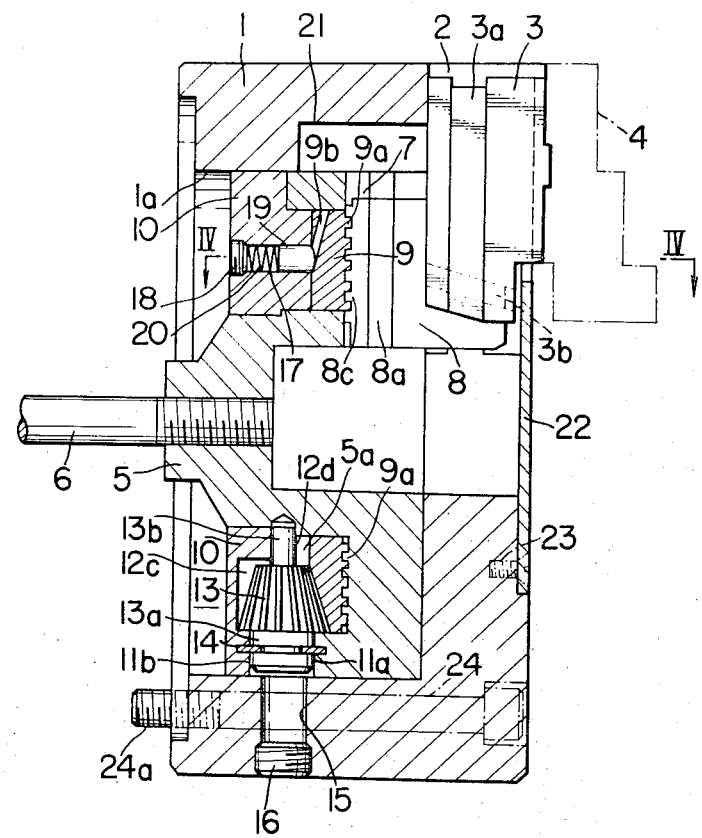
FIG. 2 is an axial sectional view taken along the planes of line II—II in FIG. 1.
Figure 3:
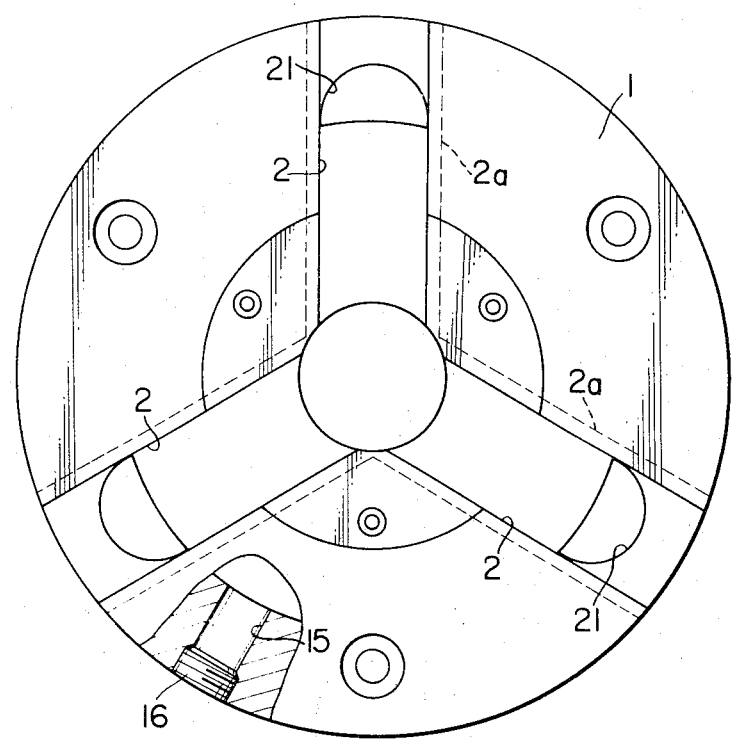
FIG. 3 is a partly broken-away front elevational view showing the chuck body proper of the example of FIG. 1.
Figure 4:
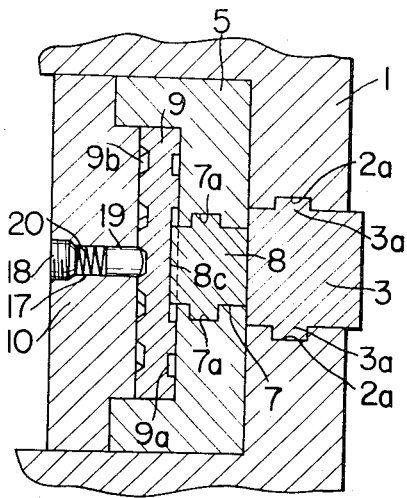
FIG. 4 is a partial sectional view taken along the plane of line IV—IV in FIG. 2.

With reference to FIGS. 1, 2, 3 and 4 of the accompanying drawings, a chuck body 1 of generally cylindrical shape is provided with a plurality of (three in this example) radial guide grooves 2 in its front face. As best shown in FIG. 4, radial grooves 2a are formed opposingly on the side surfaces of each of the guide grooves 2. A carriage 3 having on both sides thereof projections 3a which are slidably fitted in the grooves 2a is slidably received in each of the guide grooves 2. A gripping jaw 4, indicated by a dot-and-dash line in FIG. 2, is secured on the front side of each of the carriages 3. Each carriage 3 has an axial engaging groove 3b of substantially T-shaped cross section in its radially inner end, the groove 3b extending obliquely relative to the axis of the chuck body and approaching the axis in the direction toward the jaw 4 as shown in FIG. 2 and also in FIG. 6.

As illustrated in FIG. 2, a substantially cylindrical hollow or hole 1a is formed axially in the chuck body 1, and a guide block 5 is fitted therein so as to be axially slidable. The desired axial movement of this guide block is effected by a rod 6 secured centrally at its rear end, while this rod may be driven by any desired means such as, for example, a pneumatic or hydraulic cylinder (not shown). Radial guide slots 7 are formed in the front end of the guide block 5, as shown in FIGS. 2 and 4, and opposing radial guide grooves 7a are formed on both side surfaces of each guide slot 7. These guide slots 7 are in axial alignment with the respective guide grooves 2 of the chuck body 1.

As seen in FIGS. 2 and 4, a slider 8 is slidably received in each of the guide slots 7, the slider 8 being guided with its side projections 8a fitted in the guide grooves 7a. On the front side of this slider 8 there is integrally provided an engaging tongue 8b of substantially T-shaped cross section, which tongue 8b extends obliquely to slidably engage or fit in the oblique engaging groove 3b in each carriage 3, as best shown in FIG.

Figure 6:
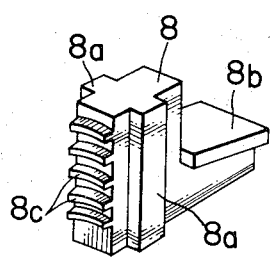
FIG. 6 is an exploded perspective view of a slider and a carriage.
Figure 6:
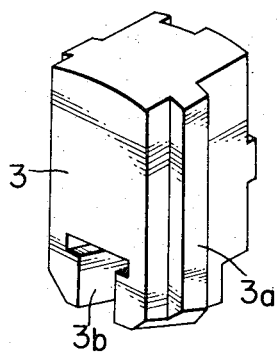

6. A rack 8c with a series of curved or arcuate teeth, also as shown in FIG. 6, is formed on the back surface of each slider 8.

Figure 5:
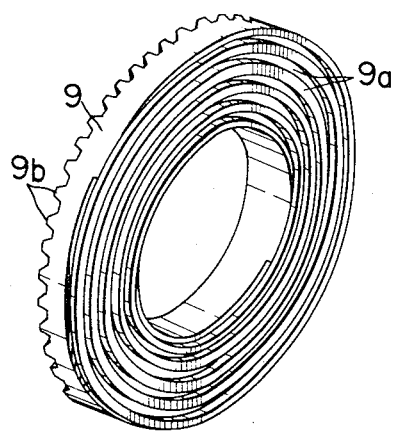
FIG. 5 is a perspective view of a rotatable annular member in the example of FIG. 1.

In the back end of the guide block 5 there is formed an annular groove 5a, in which is rotatably received an annular member 9 illustrated in detail in FIG. 5. A helical groove 9a is formed on the front surface of the annular member 9, while bevel gear teeth 9b are formed on its back surface. The helical groove 9a of the member 9 is exposed to the radial guide slots 7 and is meshed with the arcuate teeth of the rack 8c. Thus, as the annular member 9 is rotated in the groove 5a, the sliders 8 are moved radially inwards and outwards along the guide slots 7. An annular back cover 10 is installed on the back of the groove 5a in the guide block 5 and is secured thereto by suitable means to prevent the detachment of the annular member 9 from the groove 5a.

Figure 7:
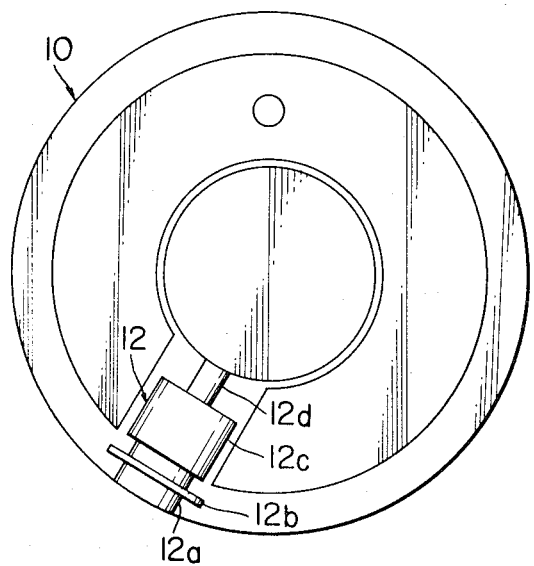
FIG. 7 is a view showing the front side of a back cover.
Figure 8:
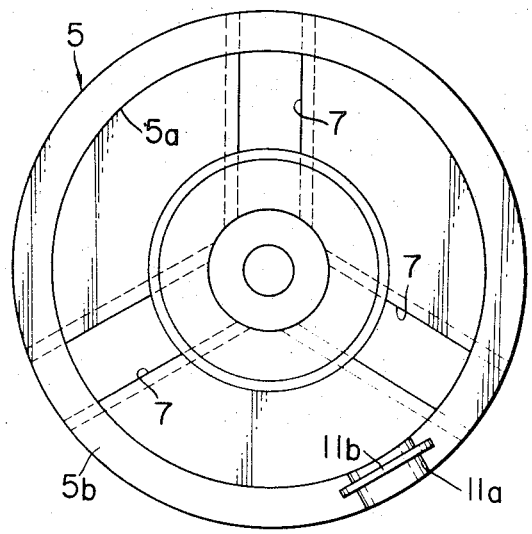
FIG. 8 is a view showing the back side of a guide block.

As shown in detail in FIG. 8, the guide block 5 is formed with a recess 11a of semicylindrical shape which extends radially through an annular flange 5b outside of its groove 5a. A semicircular recess or groove 11b is further formed in the mid-part of the recess 11a. On the front side of the back cover 10, illustrated in detail in FIG. 7, there are correspondingly provided a series of recesses generally denoted by numeral 12, including a semicylindrical recess 12a corresponding to the aforesaid recess 11a of the guide block 5 and a deeper recess or groove 12b corresponding to the recess or groove 11b of the same. Further on the radially inward side of these recesses 12a and 12b, there are formed a large recess 12c and a small recess 12d, both of semicylindrical shape.

As is apparent from FIG. 2, the correspondingly formed recesses 11a and 12a define a cylindrical space therebetween, while the correspondingly formed recesses 11b and 12b similarly define an annular space. The semicylindrical recess 12c in the back cover 10 provides a comparatively large space between the guide block 5 and the back cover, in which is installed a bevel pinion 13 meshing with the bevel teeth 9b on the annular member 9. This bevel pinion 13 is rotatably supported with its shaft 13a received in the space afforded by the recesses 11a and 12a and its shaft 13b received in the semicylindrical recess 12d in the back cover 10. The shaft 13a has an annular groove into which is snugly fitted a collar or an associated pair of ring halves 14, which collar 14 is received in the correspondingly formed recesses 11b and 12b to bear the axial thrust of the bevel pinion 13.

As illustrated in FIGS. 1, 2 and 3, the chuck body 1 has a hole 15 extending radially between the peripheral surface of the body and the end of the shaft 13a of the bevel pinion 13. This hole 15 is ordinarily kept closed by a plug 16 which is screwed thereinto. The back cover 10 is provided with a hole 17 extending axially therethrough, which also is closed by a plug 18 screwed thereinto. A pin 19 is inserted into the hole 17 and is urged toward the teeth 9b of the annular member 9 by a helical compression spring 20 to prevent the undesired or unintentional rotation of the member 9.

A hollow space 21 (FIG. 2) is formed radially outwardly of each of the guide slots 7 to permit the outward travel of each slider 8. On the front surface of the chuck body 1 there is attached a cover 22 by suitable screws 23 or the like to prevent infiltration of dust. A plurality of bolts 24, each threaded at 24a and extending axially through the chuck body 1 serve to fix the chuck to a machine (not shown).

The operation of the above described chuck in use is as follows. First of all, for ordinary chucking operation, the guide block 5 is moved axially of the chuck body 1 by suitable driving means, not shown, via the rod 6. With this movement of the guide block 5, the sliders 8 which are received in the guide slots 7 in the guide block 5 are also moved axially. Thus, the carriages 3, which have their oblique grooves 3b in engagement with the oblique tongues 8b of the sliders 8, are moved radially due to the wedging action caused by the engagement of the aforesaid oblique grooves and tongues.

It is to be understood that, in this instance, the carriages 3 and therefore the jaws 4 are capable of exercising great force owing to the wedging action.

For adjustment of the jaws 4 prior to holding a workpiece of a given size, the plug 16 is first loosened and removed out of the hole 15. The shaft 13a of the bevel pinion 13 is then turned with a suitable tool through the hole 15. In this manner, the annular member 9 is rotated to cause radial displacement of the sliders 8 having the rack 8c which meshes with the helical groove 9a of the member 9. The adjustment of the gripping jaws to adapt them for holding parts or tools of different sizes is thus made possible. This procedure may be equally effective for jaw adjustment during mechanical operation of the chuck and for the gripping of the workpiece by manual operation. It will be apparent that the pin 19 as shown in FIGS. 2 and 4 is so urged by the helical compression spring 20 as to permit the rotation of the annular member 9 in the process of jaw adjustment but to prevent any undesired or unintentional rotation thereof once it has been set to a proper angular position.

I claim:

1. A chuck comprising a body part of substantially cylindrical shape having a front face and a hole extending axially therethrough, said body part having radial guide grooves formed in the front face thereof, a plurality of carriages respectively slidably received in said radial guide grooves, workpiece gripping jaws secured on said respective carriages, a guide block axially slidably received in said hole of said body part, said guide block having a plurality of radial guide slots formed in the front end thereof so as to be respectively axially aligned with said guide grooves in said body part, means for axially moving said guide block, a plurality of sliders respectively received in said radial guide slots of said guide block so as to be radially slidable relative to the same and axially movable therewith, said sliders being respectively engaged with said carriages in a manner such that the radial movement of the former causes simultaneous radial movement of the latter while axial movement of the former causes only radial movement of the latter, and separate means for imparting radial movement to said sliders, said separate means comprising an annular member rotatably held in an annular groove formed in the back end of said guide block, said annular member being provided with a helical groove on one side surface thereof to mesh with a rack formed on each of said sliders, and a member to be turned from outside of said body part to impart rotation to said annular member.

2. The chuck according to claim 1 wherein said externally turnable member is a bevel pinion meshing with bevel teeth formed on the other side of said annular member, said bevel pinion having a shaft extending into a hole formed through said body part.

3. The chuck according to claim 2 wherein said hole is ordinarily kept closed with a plug member.

4. The chuck according to claim 2 further including an annular back cover securely mounted on the back of said annular groove of said guide block to prevent detachment of said annular member from said groove.

5. The chuck according to claim 4 wherein said shaft of said bevel pinion is securely provided with a collar which is supported by an annular recess cut into said guide block and said back cover to bear the axial thrust of said bevel pinion.

6. The chuck according to claim 4 further including means to prevent unintentional rotation of said annular member, said means comprising a pin movably inserted into a hole bored in said back cover and contacting the back side of said annular member at one end thereof, a plug member secured at the open end of said hole, and an elastic member disposed between said plug member and said pin to urge the latter against said annular member.

* * * * *